United States Patent [19]
Stahlecker et al.

[11] Patent Number: 5,380,118
[45] Date of Patent: Jan. 10, 1995

[54] SHAFT COUPLING FOR BOTTOM CYLINDERS OF DRAFTING UNITS ON SPINNING MACHINES

[75] Inventors: Hans Stahlecker; Gerhard Fetzer, both of Süssen, Germany

[73] Assignee: Spindelfabrik Suessen, Schurr, Stahlecker & Grill GmbH, Germany

[21] Appl. No.: 993,594

[22] Filed: Dec. 22, 1992

[30] Foreign Application Priority Data

Feb. 21, 1992 [DE] Germany .................. 4205322

[51] Int. Cl.⁶ ................ D01H 1/00; D01H 5/00; F16D 1/00
[52] U.S. Cl. ................ 403/343; 403/333; 403/14; 19/258
[58] Field of Search ............ 403/13, 14, 281, 282, 403/274, 273, 343, 368, 333, 296, 363; 29/525; 19/236, 258, 286, 294; 57/315

[56] References Cited

U.S. PATENT DOCUMENTS

| | | | |
|---|---|---|---|
| 1,799,884 | 4/1931 | Chantry | 403/333 |
| 1,849,066 | 3/1932 | Bridges | 403/333 |
| 1,849,510 | 3/1932 | Thomson | 403/333 |
| 2,101,684 | 12/1937 | Linn | 403/14 |
| 2,330,686 | 9/1943 | Cornell et al. | 403/333 |
| 2,584,640 | 2/1952 | Taylor | 19/258 |
| 2,601,134 | 6/1952 | Guillet | 19/258 |
| 3,969,029 | 7/1976 | Schaeffler | 403/343 |
| 4,084,829 | 4/1978 | Falchle et al. | 403/343 |
| 4,886,392 | 12/1989 | Iio | 403/282 |
| 4,930,459 | 6/1990 | Coffenberry | 29/525 |
| 4,943,067 | 7/1990 | Saunders | 403/13 |
| 5,138,760 | 8/1992 | King | 29/525 |

FOREIGN PATENT DOCUMENTS 0446690 2/1991 European Pat. Off. .

Primary Examiner—Dave W. Arola
Assistant Examiner—Anthony Knight
Attorney, Agent, or Firm—Evenson, McKeown, Edwards & Lenahan

[57] ABSTRACT

In the case of a shaft coupling for bottom cylinders of drafting units on spinning machines, a shaft is provided on its end with an area of a reduced diameter which engages in a longitudinal bore at the end of the other shaft. In the area of the longitudinal bore, the two shafts are connected with one another by means of a screw thread. In addition to the screw thread, the area of the reduced diameter also comprises two centering surfaces with fits, one fit being a clearance fit and the other fit being a press fit. As a result, radial deviations of the shafts caused by the shaft coupling are to be avoided.

21 Claims, 1 Drawing Sheet

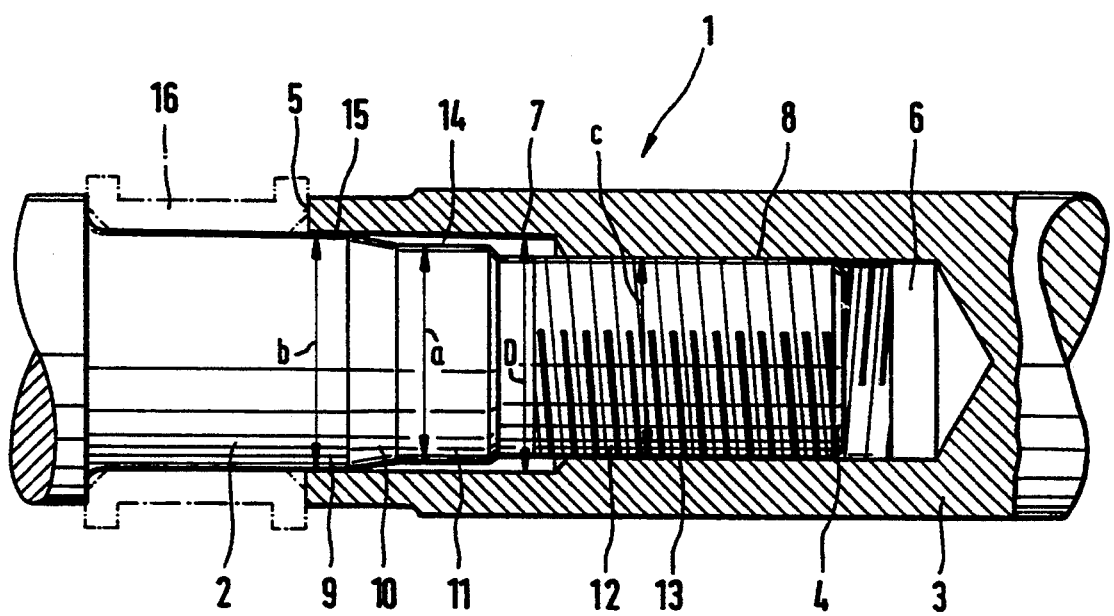

SHAFT COUPLING FOR BOTTOM CYLINDERS OF DRAFTING UNITS ON SPINNING MACHINES

BACKGROUND OF THE INVENTION

This invention relates to a shaft coupling for bottom cylinders of drafting units on spinning machines, in which one shaft has several shaft sections of different diameters which diminish toward the end in the area of one end. These shaft sections engage at one end of the other shaft in a longitudinal bore, which is adapted to the diameters by means of corresponding bore sections. One shaft section as well as a corresponding bore section has a screw thread for the form-locking transmission of the driving power, and the two other shaft sections with the corresponding bore sections are provided with fits for the forming of centering surfaces.

In the case of a shaft coupling of this type (European Patent Document EP 446 690 A1), one fit respectively forming the centering surfaces is provided on both sides of the screw thread. As a result, the guiding length of the centering surfaces as a whole is to be increased. The mentioned patent document contains nothing concerning the type of the fits for the centering surfaces so that it must be assumed that the two fits are narrowly tolerated clearance fits as they are normally provided for such shaft couplings. However, even if the tolerances are very narrow, a clearance fit at the centering surfaces always results in a certain radial deviation because the shaft sections on the centering surfaces tend to travel to the outside diameter of the bore section which is slightly larger in the bore.

It is an object of the invention to exclude radial deviations if at all possible in the case of a shaft coupling of the initially mentioned type.

This object is achieved in that one fit is a clearance fit and the other fit is a press fit.

As a result of the tolerance-caused overdimension of the assigned diameters of the press fit, the end areas of the shafts to be coupled are centered with respect to one another without any play. The clearance fit chosen for the second fit avoids redundancies in the area of the shaft coupling because a centering by means of an overdimension is carried out only at one of the two fits. The other fit has sufficient play even if this play in practice does not exceed 0.025 mm.

Advantageously, the clearance fit as well as the press fit are situated on the side of the screw thread facing away from the end of the shaft. This has the advantage that the centering surfaces of the longitudinal bore are situated as closely as possible at the end of the shaft containing the longitudinal bore, whereby the manufacturing precision becomes higher in comparison to a longitudinal bore which, according to the state of the art, has a centering surface in the area of the bore base.

In a further development of the invention, the threaded screw is first followed by the clearance fit and then by the press fit. As a result, the centering surface pertaining to the press fit is situated at the very start of the longitudinal bore which results in an easier mounting of the shaft coupling.

Expediently, the clearance fit is separated from the press fit by a conical shaft section. As a result, a gradual transition is created from the clearance fit to the press fit, in which case, at the same time, the threading is facilitated of the shaft sections of one shaft into the longitudinal bore of the other shaft.

In an advantageous development of the invention, a continuously identical diameter of the longitudinal bore is assigned to the clearance fit and to the press fit. This has the important advantage that, despite the two different fits, the longitudinal bore can be worked by means of a single tool adjustment in the area of the centering surfaces.

In an advantageous development of the invention, the shaft section assigned to the clearance fit is longer than the shaft section assigned to the press fit. In this case, the invention starts out from the recognition that the length of the shaft section assigned to the press fit should be as small as possible. This leads at the same time to reduced withdrawal forces during a demounting of the shaft coupling.

Expediently, the shaft section assigned to the clearance fit is at least twice as long as the shaft section assigned to the press fit. A length of the shaft section pertaining to the press fit of 3 mm and a length of the shaft section pertaining to the clearance fit of 7 mm were found useful.

Other objects, advantages and novel features of the present invention will become apparent from the following detailed description of the invention when considered in conjunction with the accompanying drawings.

BRIEF DESCRIPTION OF THE DRAWINGS

The single drawing figure is a longitudinal sectional view of a shaft coupling constructed according to a preferred embodiment of the invention.

DETAILED DESCRIPTION OF THE DRAWINGS

The shaft coupling 1 connects two shafts 2 and 3 with one another, Such shaft couplings 1 is suitable for bottom cylinders of drafting units on spinning machines. As a result, after the coupling, shaftings of a length of more than 30 m are obtained.

For the coupling, the area of the end 4 of shaft 2 is inserted into a longitudinal bore 6 in the area of the end 5 of shaft 3. The not shown left end of shaft 2 looks like the end 5 of shaft 3; the not shown right end of the shaft 3 looks like end 4 of shaft 2.

In the area of the end 5, the longitudinal bore 6 of shaft 3 is first provided with a bore section 7 which has a continuously uniform diameter D. Bore section 7 is followed by another bore section 8 with a reduced nominal diameter c which has a screw thread 13.

The area of the end 4 of shaft 2 which is to be inserted into the longitudinal bore 6 has a total of four shaft sections 9, 10, 11 and 12. The shaft section 12 which faces the end 4 and has the same nominal diameter c as the bore section 8 is also provided with a screw thread 13 so that the shafts 2 and 3 to be coupled can be screwed together with one another for the form-locking transmission of the driving power. The pitch of the thread is such that the shafts 2 and 3 cannot detach from one another during the operation.

The cylindrical shaft sections 9 and 11 are used for the centering of the area of the end 4 of shaft 2 in the longitudinal bore 6 or shaft 3, specifically inside the bore section 7. The outside diameters a of shaft section 11, and b of shaft section 9 are selected such that in the area of shaft section 11 a clearance fit 14 is obtained with bore section 7 and, in the area of shaft section 9, a press fit 15 is obtained with bore section 7. The shafts sections 11 and 9 are connected in such a way with one another by way of a conical shaft section 10 that, in this area, the shaft 2 increases from a diameter a to a diameter b. The shaft sections 11, 10 and 9 are situated on the side of the screw thread 13 facing away from the end 4.

As illustrated, shaft section 11 assigned to the clearance fit 14 is at least twice as long as the shaft section 9 assigned to the press fit 15. This means that shaft section 9 is considered to extend only to the point at which the end 5 of shaft 3 is situated. When the shaft coupling 1 is mounted, the end 5 of shaft 3 is supported against a bearing ring 16, which is outlined only by a dash-dotted line, of a shaft bearing which is not shown and is arranged in a bearing frame stand.

The clearance of the clearance fit 14 between the shaft section 11 and the bore section 7 is exaggerated in the drawing. In reality, the size of the clearance is between 0.006 and 0.025 mm. This size range of a clearance fit has so far been customary for shaft couplings according to the state of the art.

According to the present invention, the clearance fit 14 changes, behind the conical shaft section 10, to a press fit 15. In this area, an overdimension of between 0 and 0.019 mm exists between the shaft section 9 and the bore section 7. As a result, the shaft section 9 is definitely centered in the longitudinal bore without play, specifically in the immediate area of the end 5 of the shaft 3. In this case, the length of the shaft section 9 amounts to approximately 3 mm. In contrast, the shaft section 11 in the area of the clearance fit 14 is at least twice as long.

Because of the press fit in the area of the shaft section 9, a short centering projection is obtained which prevents radial deviations in the area of the shaft coupling 1 with sufficient precision.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A spinning machine drafting unit bottom cylinder shaft coupling, comprising:
    a first shaft with a plurality of shaft sections of different diameters at one of its ends, said diameters diminishing toward said end, and
    a second shaft with a plurality of bore sections at one of its ends, which are adapted to the respective shaft sections of different diameters of the first shaft so as to accommodate insertion of said end of the first shaft into said end of the second shaft,
    wherein one shaft section of said first shaft and one bore section of said second shaft have interengageable screw threads for connecting said shafts in a form-locking driving power transmission connection,
    wherein two unthreaded cylindrical sections of said first shaft and bore sections of said second shaft are provided with respective fits for forming centering surfaces, and
    wherein one of said fits is a clearance fit and the other of said fits is a press fit, said press fit and said interengageable screw threads being the only frictional connections of the shaft coupling.

2. A shaft coupling according to claim 1, wherein the shaft section assigned to the clearance fit is longer than the shaft section assigned to the press fit.

3. A shaft coupling according to claim 1, wherein the clearance fit as well as the press fit are situated on the side of the screw threads facing away from the end of the shaft.

4. A shaft coupling according to claim 3, wherein the shaft section assigned to the clearance fit is longer than the shaft section assigned to the press fit.

5. A shaft coupling according to claim 4, wherein the shaft section assigned to the clearance fit is at least twice as long as the shaft section assigned to the press fit.

6. A shaft coupling according to claim 3, wherein the clearance between the first and second shafts at the clearance fit is between 0.006 and 0.025 millimeters.

7. A shaft coupling according to claim 3, wherein the screw threads are first followed by the clearance fit and then by the press fit.

8. A shaft coupling according to claim 7, wherein the clearance fit is separated from the press fit by means of a conical shaft section.

9. A shaft coupling according to claim 8, wherein a diameter (D) of a uniformly equal size of the longitudinal bore is assigned to the clearance fit and to the press fit.

10. A shaft coupling according to claim 8, wherein the shaft section assigned to the clearance fit is longer than the shaft section assigned to the press fit.

11. A shaft coupling according to claim 10, wherein the shaft section assigned to the clearance fit is at least twice as long as the shaft section assigned to the press fit.

12. A shaft coupling according to claim 7, wherein a diameter (D) of a uniformly equal size of the longitudinal bore is assigned to the clearance fit and to the press fit.

13. A shaft coupling according to claim 12, wherein the shaft section assigned to the clearance fit is longer than the shaft section assigned to the press fit.

14. A shaft coupling according to claim 13, wherein the shaft section assigned to the clearance fit is at least twice as long as the shaft section assigned to the press fit.

15. A shaft coupling according to claim 7, wherein the shaft section assigned to the clearance fit is longer than the shaft section assigned to the press fit.

16. A shaft coupling according to claim 15, wherein the shaft section assigned to the clearance fit is at least twice as long as the shaft section assigned to the press fit.

17. A shaft coupling for bottom cylinders of drafting units on spinning machines, comprising:
    a first shaft with a plurality of shaft sections of different diameters at one of its ends, said diameters diminishing toward said end, and
    a second shaft with a plurality of bore sections at one of its ends, which are adapted to the respective shaft sections of different diameters of the first shaft so as to accommodate insertion of said end of the first shaft into said end of the second shaft,
    wherein one shaft section of said first shaft and one bore section of said second shaft have interengageable screw threads for connecting said shafts in a form-locking driving power transmission connection,
    wherein two unthreaded cylindrical sections of said first shaft and bore sections of said second shaft are provided with respective fits for forming centering surfaces, and wherein one of said fits is a clearance fit and the other of said fits is a press fit, wherein the shaft section assigned to the clearance fit is at least twice as long as the shaft section assigned to the press fit.

18. A shaft coupling for bottom cylinders of drafting units on spinning machines, comprising:

a first shaft with a plurality of shaft sections of different diameters at one of its ends, said diameters diminishing toward said end, and a second shaft with a plurality of bore sections at one of its ends, which are adapted to the respective shaft sections of different diameters of the first shaft so as to accommodate insertion of said end of the first shaft into said end of the second shaft, wherein one shaft section of said first shaft and one bore section of said second shaft have interengageable screw threads for connecting said shafts in a form-locking driving power transmission connection, wherein two unthreaded cylindrical sections of said first shaft and bore sections of said second shaft are provided with respective fits for forming centering surfaces, and wherein one of said fits is a clearance fit and the other of said fits is a press fit, wherein the clearance between the first and second shafts at the clearance fit is between 0.006 and 0.025 millimeters.

19. A shaft coupling according to claim 18, wherein the clearance between the first and second shafts at the clearance fit is between 0.006 and 0.025 millimeters.

20. A shaft coupling for bottom cylinders of drafting units on spinning machines, comprising:

a first shaft with a plurality of shaft sections of different diameters at one of its ends, said diameters diminishing toward said end, and a second shaft with a plurality of bore sections at one of its ends, which are adapted to the respective shaft sections of different diameters of the first shaft so as to accommodate insertion of said end of the first shaft into said end of the second shaft, wherein one shaft section of said first shaft and one bore section of said second shaft have interengageable screw threads for connecting said shafts in a form-locking driving power transmission connection, wherein two unthreaded cylindrical sections of said first shaft and bore sections of said second shaft are provided with respective fits for forming centering surfaces, and wherein one of said fits is a clearance fit and the other of said fits is a press fit, wherein an overdimension of up to 0.019 millimeters exists between the first and second shafts at the press fit.

21. A shaft coupling for bottom cylinders of drafting units on spinning machines, comprising:

a first shaft with a plurality of shaft sections of different diameters at one of its ends, said diameters diminishing toward said end, and a second shaft with a plurality of bore sections at one of its ends, which are adapted to the respective shaft sections of different diameters of the first shaft so as to accommodate insertion of said end of the first shaft into said end of the second shaft, wherein one shaft section of said first shaft and one bore section of said second shaft have interengageable screw threads for connecting said shafts in a form-locking driving power transmission connection, wherein two unthreaded cylindrical sections of said first shaft and bore sections of said second shaft are provided with respective fits for forming centering surfaces, and wherein one of said fits is a clearance fit and the other of said fits is a press fit, wherein the length of the shaft section along the press fit is approximately 3 millimeters.

* * * * *